(12) United States Patent
Ariizumi

(10) Patent No.: US 11,636,321 B2
(45) Date of Patent: Apr. 25, 2023

(54) DATA PROCESSING APPARATUS AND CONTROL METHOD

(71) Applicant: CANON KABUSHIKI KAISHA, Tokyo (JP)

(72) Inventor: Masahiro Ariizumi, Nagoya (JP)

(73) Assignee: Canon Kabushiki Kaisha, Tokyo (JP)

( * ) Notice: Subject to any disclaimer, the term of this patent is extended or adjusted under 35 U.S.C. 154(b) by 380 days.

(21) Appl. No.: 16/890,183

(22) Filed: Jun. 2, 2020

(65) Prior Publication Data

US 2020/0394505 A1    Dec. 17, 2020

(30) Foreign Application Priority Data

Jun. 13, 2019  (JP) .............................. JP2019-110520

(51) Int. Cl.
*G06N 3/063*  (2006.01)
*G06F 17/15*  (2006.01)
*G06N 3/04*  (2023.01)

(52) U.S. Cl.
CPC ............. *G06N 3/063* (2013.01); *G06F 17/15* (2013.01); *G06N 3/04* (2013.01)

(58) Field of Classification Search
CPC ........ G06N 3/063; G06N 3/04; G06N 3/0454; G06N 3/082; G06F 17/15; G06T 1/20
USPC .......................................................... 706/15
See application file for complete search history.

(56) References Cited

U.S. PATENT DOCUMENTS

| 5,142,666 | A | * | 8/1992 | Yoshizawa | G06N 3/04 706/38 |
| 7,539,549 | B1 | * | 5/2009 | Discenzo | G05B 23/024 702/183 |
| 2012/0078099 | A1 | * | 3/2012 | Suri | A61B 8/483 600/440 |
| 2013/0022083 | A1 | * | 1/2013 | Vasseur | H04L 12/4035 375/132 |
| 2018/0253641 | A1 | | 9/2018 | Yachide et al. | G06N 3/063 |
| 2019/0121338 | A1 | * | 4/2019 | Celia | G06N 3/0454 |
| 2020/0293885 | A1 | | 9/2020 | Yoshinaga | G06N 3/08 |

FOREIGN PATENT DOCUMENTS

| JP | 2017-156941 | | 9/2017 | |
| JP | 2018-147182 | | 9/2018 | |
| JP | 2020201883 | * | 6/2019 | ............. G06N 3/063 |
| JP | 2020149156 | * | 9/2020 | ............... G06N 3/04 |

* cited by examiner

*Primary Examiner* — Jerome Grant, II
(74) *Attorney, Agent, or Firm* — Venable LLP

(57) ABSTRACT

There is provided with a data processing apparatus that carries out a computation corresponding to a neural network containing a plurality of layers. A processing unit includes a plurality of processors that, through pipeline processing, sequentially calculate data of each of blocks, each block corresponding to a part of a feature plane in one layer. A control unit determines a calculation order for the data of the blocks on the basis of structure information of the neural network, and sends a command that controls the calculation order to the plurality of processors.

20 Claims, 14 Drawing Sheets

FIG. 1

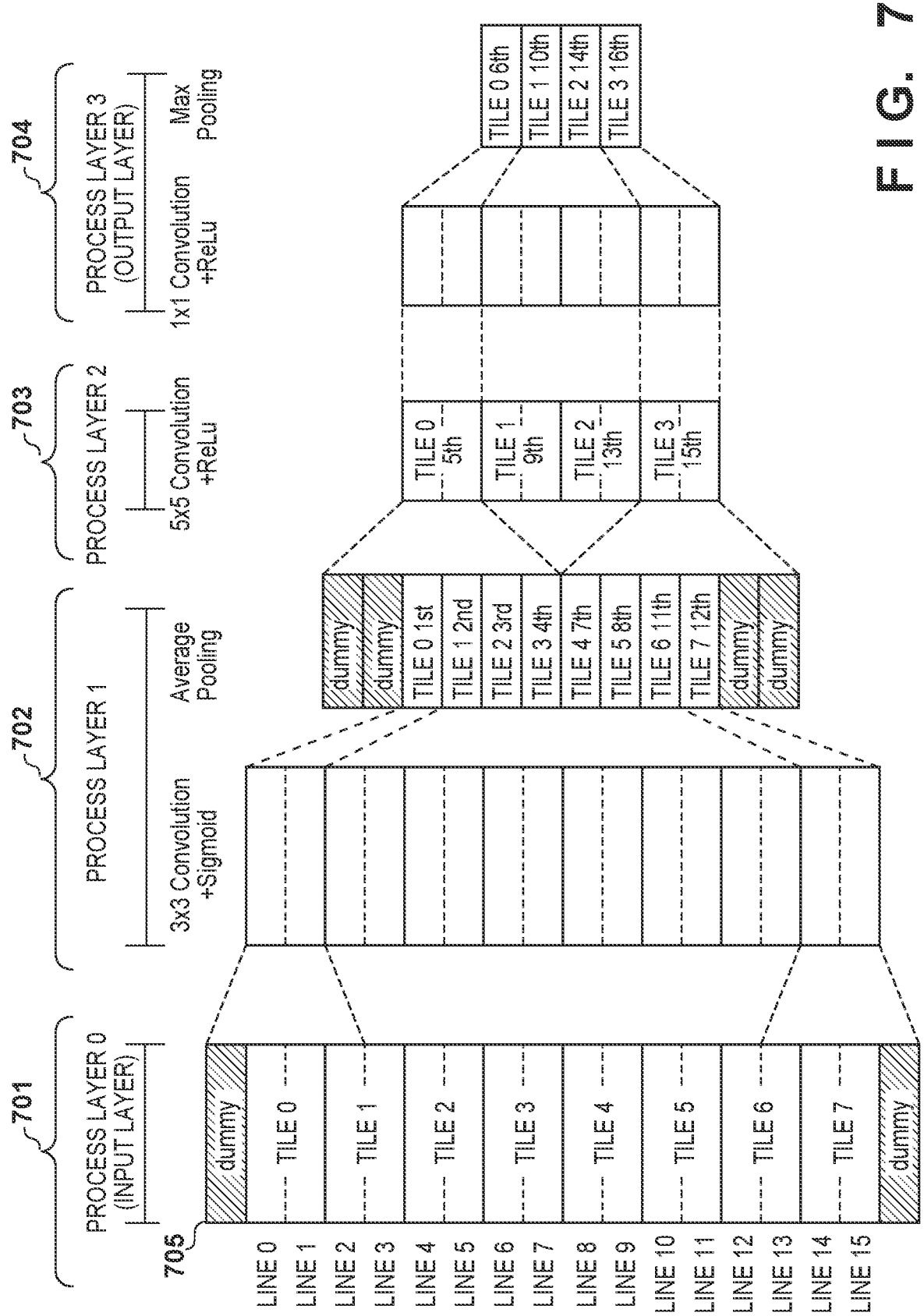

FIG. 9A

| 1001 | NumLayer | 4 |
|---|---|---|
| 1002 | InputImageWidth | 24 |
| | InputImageHeight | 16 |
| 1003 | Layer[0].NumFeatureMap | 3 |
| | Layer[0].KernelSize | dummy |
| | Layer[0].Activation type | dummy |
| | Layer[0].PoolingType | dummy |
| 1004 | Layer[1].NumFeatureMap | 4 |
| | Layer[1].KernelSize | 3 |
| | Layer[1].Activation type | 0 |
| | Layer[1].PoolingType | 2 |
| 1005 | Layer[2].NumFeatureMap | 7 |
| | Layer[2].KernelSize | 5 |
| | Layer[2].ActivationType | 1 |
| | Layer[2].PoolingType | 0 |
| 1006 | Layer[3].NumFeatureMap | 7 |
| | Layer[3].KernelSize | 1 |
| | Layer[3].ActivationType | 1 |
| | Layer[3].PoolingType | 1 |

ActivationType :
0: Sigmoid
1: ReLU

PoolingType :
0: NO POOLING
1: MAX POOLING
2: AVERAGE POOLING

FIG. 9B

| | | |
|---|---|---|
| 1101 | NumLayer | |
| 1102 | Layer[0].Width | 24 |
| | Layer[0].Height | 16 |
| | Layer[0].NumFeatureMap | 3 |
| | Layer[0].NumTile | dummy |
| | Layer[0].KernelSize | dummy |
| | Layer[0].Activation type | dummy |
| | Layer[0].PoolingType | dummy |
| 1103 | Layer[1].Width | 12 |
| | Layer[1].Height | 8 |
| | Layer[1].NumFeatureMap | 4 |
| | Layer[1].NumTile | 8 |
| | Layer[1].KernelSize | 3 |
| | Layer[1].ActivationType | 0 |
| | Layer[1].PoolingType | 2 |
| 1104 | Layer[2].Width | 12 |
| | Layer[2].Height | 8 |
| | Layer[2].NumFeatureMap | 7 |
| | Layer[2].NumTile | 4 |
| | Layer[2].KernelSize | 5 |
| | Layer[2].ActivationType | 1 |
| | Layer[2].PoolingType | 0 |
| 1105 | Layer[3].Width | 6 |
| | Layer[3].Height | 4 |
| | Layer[3].NumFeatureMap | 7 |
| | Layer[3].NumTile | 4 |
| | Layer[3].KernelSize | 1 |
| | Layer[3].ActivationType | 1 |
| | Layer[3].PoolingType | 1 |

ActivationType :
0: Sigmoid
1: ReLU

PoolingType :
0: NO POOLING
1: MAX POOLING
2: AVERAGE POOLING

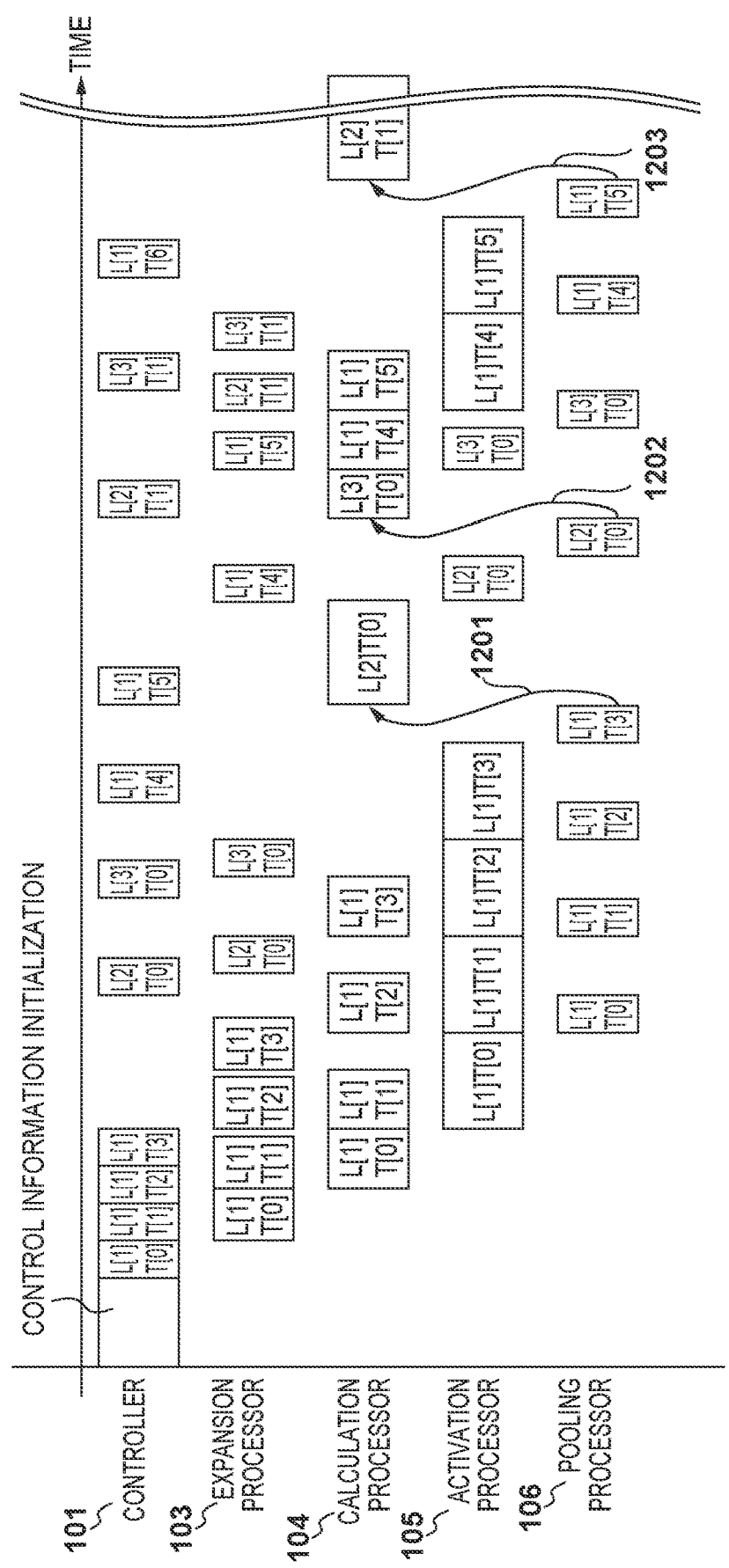

DATA PROCESSING APPARATUS AND CONTROL METHOD

BACKGROUND OF THE INVENTION

Field of the Invention

The present invention relates to a data processing apparatus and a control method, and particularly relates to processing using a neural network, such as processing for recognizing a specific pattern in target data, for example.

Description of the Related Art

Computational processing that uses neural networks is being applied in a growing number of fields. For example, advancements in deep learning have led to an increase in the accuracy of image recognition. Convolutional neural networks (CNN) are typically used for deep learning.

Computational processing using a neural network such as a CNN includes many product-sum operations, and there is demand for such operations to be carried out efficiently. There is also demand for carrying out operations using neural networks configured in a variety of different ways, depending on the purpose of the processing. What is needed, therefore, is a data processing apparatus capable of efficiently carrying out operations using a variety of neural networks, in order to use such neural networks in embedded systems, such as in mobile terminals, in-vehicle devices, and the like.

As a configuration for efficiently carrying out operations using a neural network, Japanese Patent Laid-Open No. 2017-156941 discloses carrying out a pooling process in a previous layer, and a statistical process required for normalization processing in the next layer, in parallel.

SUMMARY OF THE INVENTION

According to an embodiment of the present invention, a data processing apparatus that carries out a computation corresponding to a neural network containing a plurality of layers, the apparatus comprising: a processing unit including a plurality of processors configured to, through pipeline processing, sequentially calculate data of each of blocks, each block corresponding to a part of a feature plane in one layer; and a control unit configured to determine a calculation order for the data of the blocks on the basis of structure information of the neural network, and to send a command that controls the calculation order to the plurality of processors.

According to another embodiment of the present invention, a control method for carrying out a computation corresponding to a neural network containing a plurality of layers comprises: performing pipeline processing to calculate data of each of blocks with a plurality of processors, each block corresponding to a part of a feature plane in one layer; determining a calculation order for the data of the blocks on the basis of structure information of the neural network; and sending a command that controls the calculation order to the plurality of processors.

Further features of the present invention will become apparent from the following description of exemplary embodiments (with reference to the attached drawings).

BRIEF DESCRIPTION OF THE DRAWINGS

FIG. 1 is a block diagram illustrating an example of a data processor according to one embodiment.

FIG. 7 is a diagram illustrating a generation order of control commands according to one embodiment.

FIGS. 9A and 9B are diagrams illustrating network information and processing parameters for each of process layers.

FIG. 10 is a time chart illustrating pipeline processing according to one embodiment.

DESCRIPTION OF THE EMBODIMENTS

Figure 2:
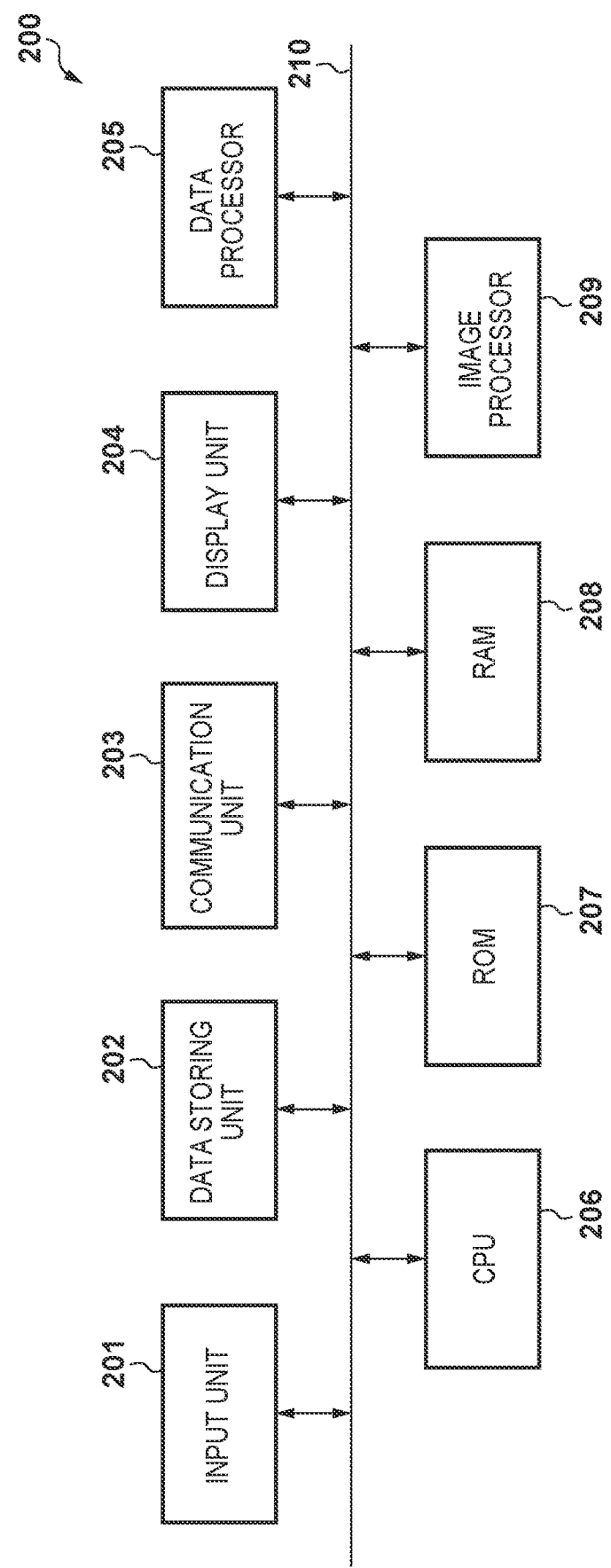
FIG. 2 is a block diagram illustrating an example of a data processing apparatus according to one embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

The invention disclosed in Japanese Patent Laid-Open No. 2017-156941 is configured so that computational processing is carried out on an intermediate layer-by-intermediate layer basis, in order from the intermediate layer closest to the input layer side. However, depending on the type of the neural network, there are situations where computational resources or memory resources can be used more efficiently by changing the order of processes in the computational processing.

According to one embodiment of the present invention, computations using a neural network can be carried out efficiently regardless of the order of the computations.

First Embodiment

A data processing apparatus according to one embodiment of the present invention can carry out computations corresponding to a neural network including a plurality of layers. FIG. 2 is a block diagram illustrating the hardware configuration of a data processing apparatus 200, which is an example of the configuration of the data processing apparatus according to one embodiment of the present invention.

Figure 5:
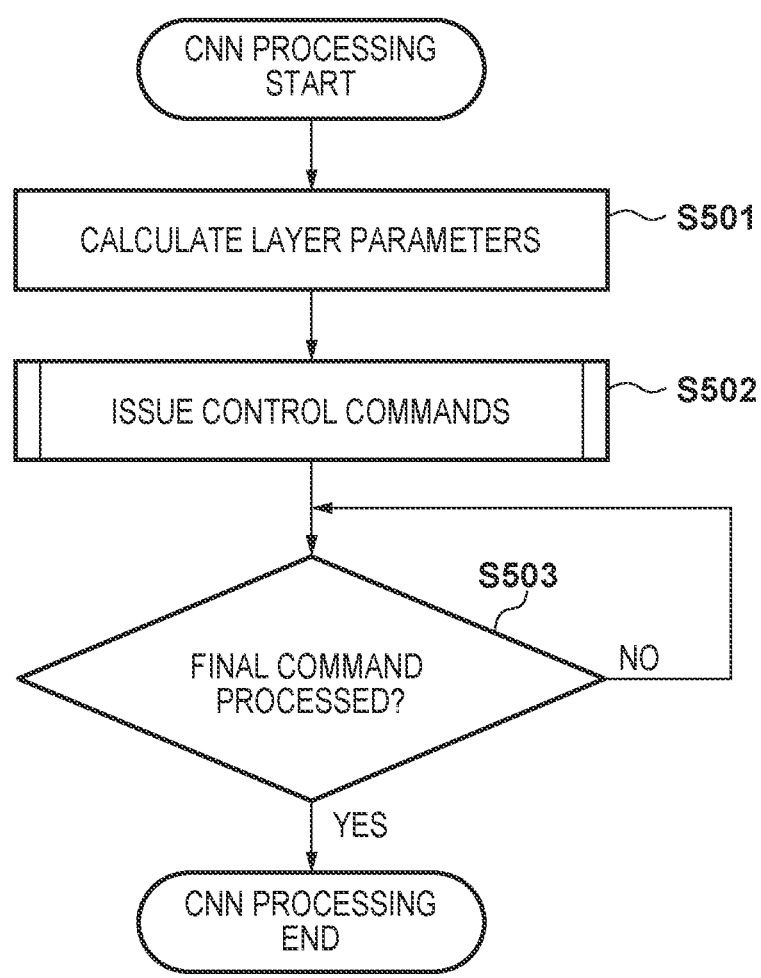
FIG. 5 is a flowchart illustrating processing carried out by a controller according to one embodiment.

As will be described in detail later, a data processor 205 includes a plurality of processors and a controller, and carries out computations corresponding to a neural network including a plurality of layers. The data processing apparatus 200 illustrated in FIG. 2 uses the data processor 205 to carry out computations corresponding to a neural network on an image. For example, the data processor 205 can carry out processing as indicated in the flowchart of FIG. 5 using an image processed by an image processor 209 and stored in RAM 208, and network information of a CNN, and can then output a result of the processing to a data storing unit 202. However, the data processor 205 may be used in applications aside from image processing. In other words, the configuration illustrated in FIG. 2 aside from the data processor 205 is not absolutely necessary in the present invention.

An input unit 201 is a device that accepts instructions or data from a user. The input unit 201 may be a keyboard, a pointing device, buttons, or the like, for example.

The data storing unit 202 can store data such as image data. The data storing unit 202 may be a hard disk, a flexible disk, a CD-ROM, a CD-R, a DVD, a memory card, a CF card, a SmartMedia, an SD card, a Memory Stick, an xD-Picture Card, USB memory, or the like, for example. The data storing unit 202 may store programs or other data. Note that part of the RAM 208 (described later) may be used as the data storing unit 202.

A communication unit 203 is an interface (I/F) for communicating between devices. The data processing apparatus 200 can exchange data with other devices via the communication unit 203. Note that the data processing apparatus 200 may use a storage device connected via the communication unit 203 as the data storing unit 202.

A display unit 204 is a device that displays information to the user or the like. The display unit 204 can display images from before image processing or after image processing, or can display other images such as a GUI or the like, for example. The display unit 204 may be a CRT or liquid crystal display, for example. The display unit 204 may be an external device connected to the data processing apparatus 200 by a cable or the like. Note that the input unit 201 and the display unit 204 may be the same device, e.g., the input unit 201 and the display unit 204 may be a touchscreen device. In this case, an input made on the touchscreen corresponds to an input made in the input unit 201.

A CPU 206 controls the operations of the data processing apparatus 200 as a whole. Additionally, the CPU 206 carries out various types of processing, such as image processing or image recognition processing, on the basis of processing results generated by the data processor 205 and stored in the data storing unit 202. The CPU 206 can store these processing results in the RAM 208.

ROM 207 and the RAM 208 provide, to the CPU 206, programs, data, operating areas, and the like necessary for processing carried out by the CPU 206. The programs necessary for the processing carried out by the CPU 206 may be stored in the data storing unit 202 or the ROM 207, and may be loaded into the RAM 208 from the data storing unit 202 or the ROM 207. The data processing apparatus 200 may receive programs via the communication unit 203. In this case, the programs may be loaded into the RAM 208 after first being recorded into the data storing unit 202, or may be loaded directly into the RAM 208 from the communication unit 203. In either case, the CPU 206 can execute the programs loaded into the RAM 208.

The image processor 209 can carry out image processing on the image data. For example, in response to an instruction from the CPU 206, the image processor 209 can read out image data that has been written into the data storing unit 202, adjust a range of pixel values, and write a result of the processing into the RAM 208.

A bus 210 connects the above-described units to each other so that those units can exchange data with each other.

The data processing apparatus 200 illustrated in FIG. 2 includes the above-described units in its interior. However, units including the input unit 201, the data storing unit 202, and the display unit 204, for example, may be connected to each other over a communication path compliant with a known communication method. In other words, the data processing apparatus according to one embodiment may be constituted by a plurality of devices physically separate from each other.

Additionally, although the data processing apparatus 200 illustrated in FIG. 2 includes a single CPU 206, the apparatus may include a plurality of CPUs. Furthermore, the functions of at least some of the units of the data processing apparatus 200 (e.g., the data processor 205 and the image processor 209) may be realized by the CPU 206 operating in accordance with programs.

The data processing apparatus 200 may include various constituent elements not illustrated in FIG. 2 as well, but those units will not be described here.

Figure 3:
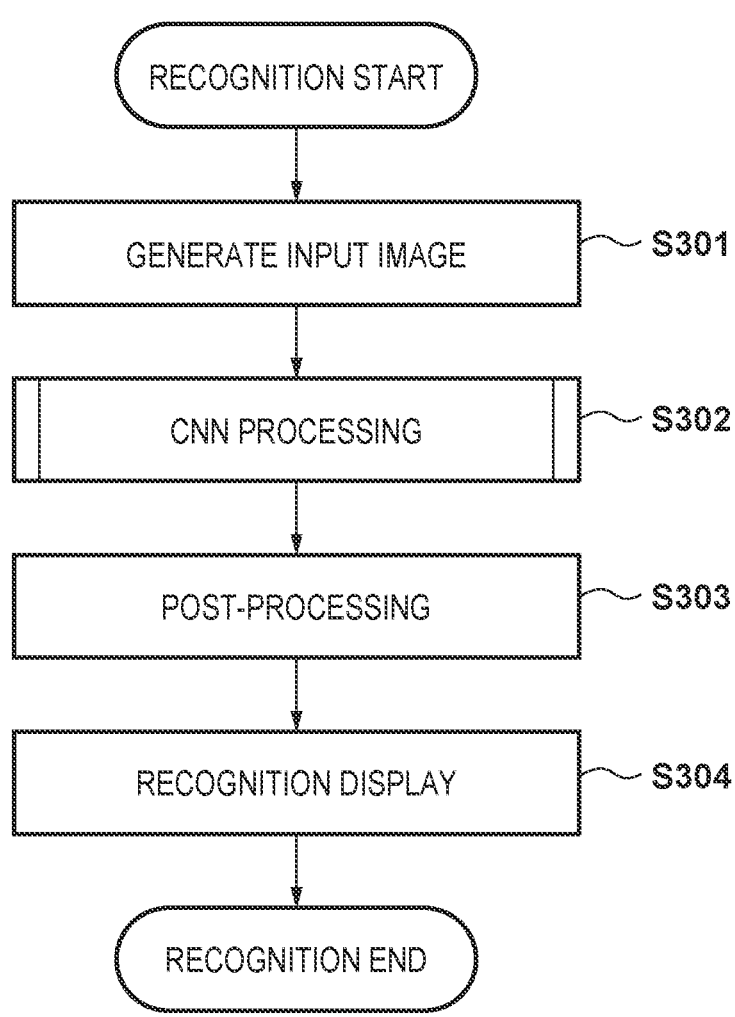
FIG. 3 is a flowchart illustrating processing carried out by the data processing apparatus according to one embodiment.

FIG. 3 is a flowchart illustrating an example of processing carried out by the data processing apparatus 200. In step S301, in response to a command from the CPU 206, the image processor 209 carries out image processing on an image written into the data storing unit 202, and writes a result of the processing into the RAM 208.

In step S302, in response to a command from the CPU 206, the data processor 205 carries out CNN computational processing on the image written into the RAM 208 in step S301.

In step S303, the CPU 206 carries out post-processing, such as processing for recognizing an object in the image, using a computation result obtained in step S302. The CPU 206 can also write a result of the recognition into the RAM 208. For example, the CPU 206 can overlay the result of the recognition processing onto the image written into the RAM 208 in step S301.

In step S304, the display unit 204 displays the result of the recognition processing carried out in step S303. For example, the display unit 204 can display, in a display device, an image on which the result of the recognition processing carried out in step S303 is overlaid.

Example of Structure of Neural Network

The data processing apparatus according to the present embodiment can carry out computations corresponding to a variety of neural networks. The following will describe an example of a neural network used by the data processing apparatus.

Figure 4:
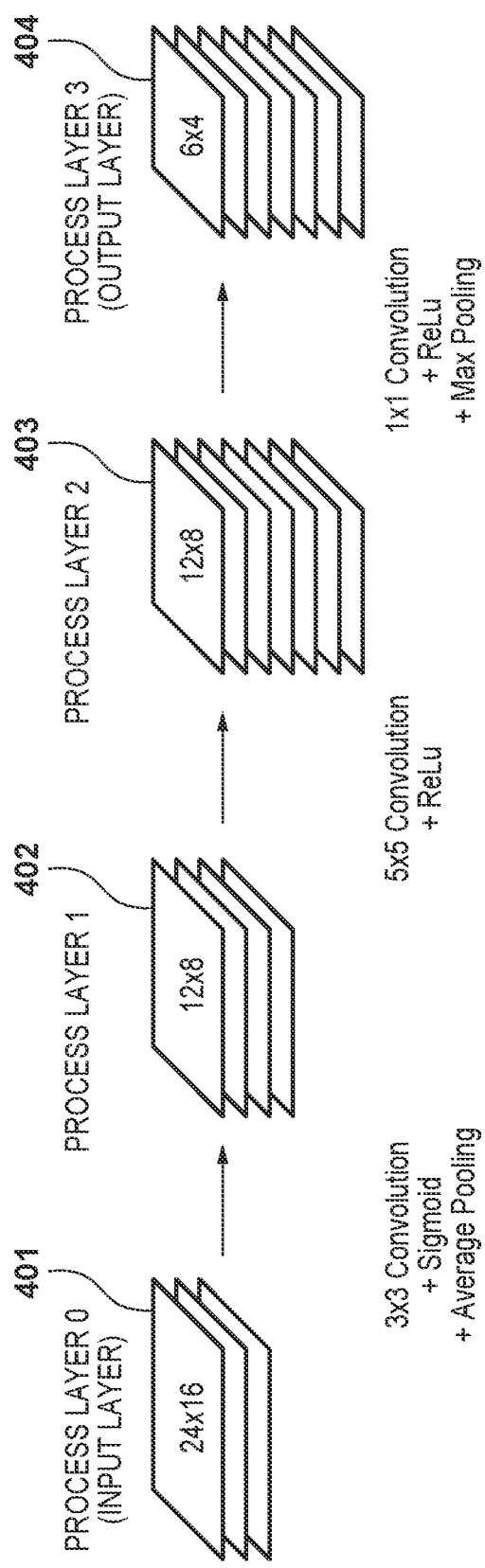
FIG. 4 is a diagram illustrating an example of the structure of a neural network.

A CNN, which is a kind of neural network, has a structure in which multiple intermediate layers are cascade-connected. Hereinafter, a feature plane (feature image) obtained by carrying out processing corresponding to an intermediate layer for a feature plane (feature image) of a previous layer will be referred to as the feature plane (feature image) of the intermediate layer. The CNN has convolutional layers as intermediate layers. For example, the CNN illustrated in FIG. 4 has a structure in which a plurality of blocks are connected, with one block having three intermediate layers, i.e., a convolutional layer, an activation layer, and a pooling layer, connected in order. Hereinafter, the block will be called a "process layer". The CNN illustrated in FIG. 4 is a network having four process layers (process layer 0 to process layer 3). However, process layer 0 corresponds to an input layer, and thus process layer 0 has none of the convolutional layer, the activation layer, and the pooling layer. The feature plane in one process layer is obtained by carrying out processing corresponding to the convolutional layer on the feature plane of a previous process layer, carrying out processing corresponding to the activation layer on the feature plane obtained from the convolutional layer processing, and then carrying out processing corresponding to the pooling layer on the feature plane obtained from the activation layer processing.

The processing corresponding to the convolutional layer is equivalent to a filtering process on the feature plane. In other words, the feature plane of the convolutional layer is obtained by carrying out a filtering process using pixel values of the feature plane of the previous layer and filter coefficients. The filter coefficients can be determined through learning, for example. The filtering process is a product-sum operation (a convolution operation), and includes a plurality of multiplication and cumulative addition operations.

A feature plane ($O_{i,j}(n)$) of the convolutional layer can be calculated through the following equation, using a feature plane ($I_{i,j}(m)$) of the previous layer and filter coefficients ($C_{0,0}(m,n)$ to $C_{X-1,Y-1}(m,n)$) corresponding to the convolutional layer.

$$O_{i,j}(n) = \sum_{m=1}^{M} \sum_{x=0}^{X-1} \sum_{y=0}^{Y-1} (I_{i+x, j+y}(m) \times C_{x, y}(m, n))$$

In the above equation, i and j represent coordinates in the feature plane. n represents the number of the feature plane in the convolutional layer. m is the number of the feature plane in the previous layer, and there are M feature planes in the previous layer. In this manner, a plurality of feature planes in the previous layer can be used to calculate a single feature plane in the convolutional layer. Additionally, the number of filter coefficients ($C_{0,0}(m,n)$ to $C_{X-1,Y-1}(m,n)$) applied to an mth feature plane to calculate an nth feature plane is X×Y, and differs from feature plane to feature plane. Here, the number of product-sum operations for calculating the value of a feature plane ($O_{i,j}(n)$) in the convolutional layer, at coordinates (i,j), is M×X×Y.

The processing corresponding to the activation layer is an activation process carried out on the feature plane from the previous layer (e.g., a product-sum operation result $O_{i,j}(n)$ in the convolutional layer). Processing used in the field of CNNs, such as processing using a sigmoid function or a ReLu function, can be used as the activation process.

The processing corresponding to the pooling layer is a pooling process carried out on the feature plane from the previous layer (e.g., the activation layer). Processing used in the field of CNNs can be used as the pooling process. In the present embodiment, a 2×2 maximum, minimum, or average filtering process, and a subsequent 2×2 stride process, are carried out as the pooling process. However, whether or not a pooling layer is present is determined for each process layer. In other words, process layers that include pooling layers and process layers that do not include pooling layers may be intermixed.

The processing carried out in process layers 1 to 3 illustrated in FIG. 4 will be described in further detail. In process layer 1, a filtering process with a kernel size of 3×3, which uses feature planes 401 and filter coefficients, an activation process using a sigmoid function, and a pooling process using an average filter are carried out. Feature planes 402 of process layer 1 are generated as a result. In process layer 2, a filtering process with a kernel size of 5×5, which uses the feature planes 402 and filter coefficients, and an activation process using a ReLu function are carried out. Feature planes 403 of process layer 2 are generated as a result. In process layer 3, a filtering process with a kernel size of 1×1, which uses the feature planes 403 and filter coefficients, an activation process using a ReLu function, and a pooling process using a max filter are carried out. Feature planes 404 of process layer 3 are generated as a result.

The feature planes 401 are three (RGB channel) input images having a size of 24×16. The feature planes 402 are four feature planes having a size of 12×8. The feature planes 403 are seven feature planes having a size of 12×8. The feature planes 404 are seven feature planes having a size of 6×4. The feature planes 404 are the output result of the CNN illustrated in FIG. 4.

Such information defining the processing carried out according to the CNN, i.e., information indicating the structure of the CNN, may be created in advance. In the present embodiment, such information is stored in the RAM 208. The information indicating the structure of the CNN can include, for example, information indicating the size of the feature planes in the input layer (the input images), the kernel sizes of the filters used in the convolutional layers in process layers 1 to 3, and the number of feature planes in the process layers 1 to 3. Additionally, the information indicating the structure of the CNN can include information indicating the types of activation functions applied in the activation layers of process layers 1 to 3, as well as whether or not a pooling layer is present, and the type of the pooling layer, in the process layers 1 to 3.

Configuration of Data Processor 205

Figure 1:
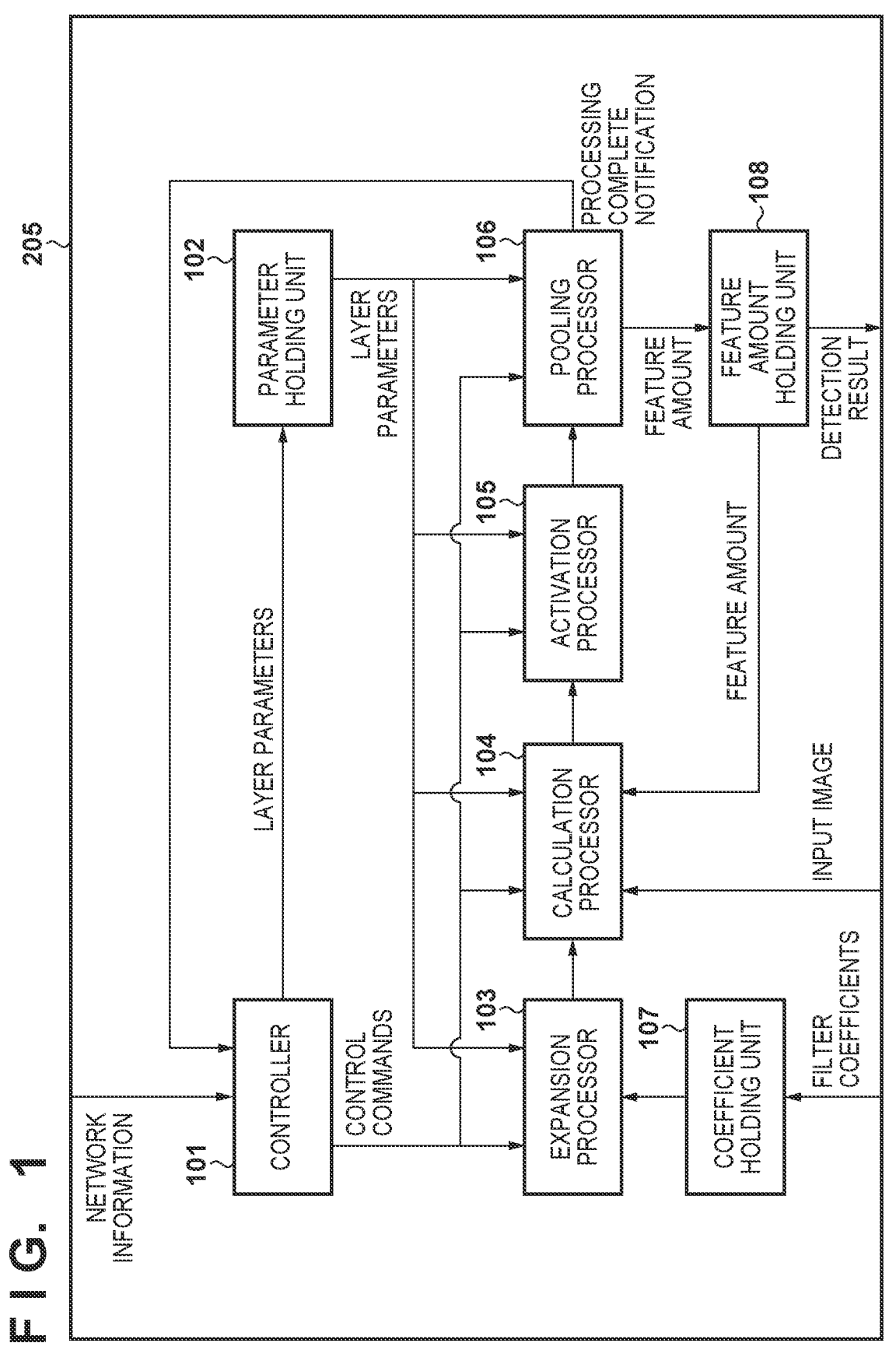

The configuration of the data processor 205 will be described next with reference to FIG. 1. The data processor 205 includes an expansion processor 103, a calculation processor 104, an activation processor 105, and a pooling processor 106 as a plurality of processors. The plurality of processors sequentially calculate data of the respective blocks corresponding to parts of the feature planes in a single layer, through pipeline processing. Each processor can calculate a feature plane by repeating the calculation of the data of the blocks. Hereinafter, "blocks" may be referred to as "tiles". In the following example, the size of a single tile is a width of the feature plane×2 lines.

The expansion processor 103 can obtain filter coefficients and transfer the filter coefficients to the calculation processor 104. The expansion processor 103 can obtain filter coefficients for a block corresponding to a control command (described later). The expansion processor 103 can obtain the filter coefficients for a block by, for example, reading out run-length coded coefficient values from a coefficient holding unit 107 on the basis of a process layer number included in the control command and decoding the coefficient values. Additionally, the expansion processor 103 can read out information indicating the kernel size and the number of feature planes for the block from a parameter holding unit 102 on the basis of the process layer number included in the control command, and can obtain the filter coefficients on the basis of this information.

The calculation processor 104 can carry out a filtering process on the feature planes in the previous process layer, on a tile-by-tile basis, using the filter coefficients transferred from the expansion processor 103. The calculation processor 104 then outputs data of the feature planes, which is the result of the filtering process, to the activation processor 105. The calculation processor 104 can obtain the feature planes in the previous process layer, which are used to calculate the data of the block indicated in the control command (described later), from a feature amount holding unit 108. Note that when processing process layer 1, the calculation processor 104 can obtain the input images from the RAM 208. Additionally, the calculation processor 104 can read out information indicating the kernel size of the filtering process from the parameter holding unit 102 on the basis of the process layer number included in the control command, and can carry out the filtering process on the basis of this information. Note that the calculation processor 104 can add a blank margin around the loaded feature planes in order to ensure that the size of the feature planes remains the same between before and after the filtering process.

The activation processor 105 carries out the activation process on the feature planes transferred from the calculation processor 104. The activation processor 105 then outputs data of the feature planes, which is the result of the activation process, to the pooling processor 106. The activation processor 105 can obtain information instructing the activation process for a block corresponding to the control command (described later). For example, the activation processor 105 can obtain information indicating the activation function to be used, stored in the parameter holding unit 102, on the basis of the process layer number included in the control command, and can carry out the activation process in accordance with the obtained information.

The pooling processor 106 carries out the pooling process on the feature planes transferred from the activation processor 105. The pooling processor 106 can obtain information instructing the pooling process for a block corresponding to the control command (described later). For example, the pooling processor 106 can obtain information indicating whether or not a pooling process will be used, as well as a pooling process method, which is stored in the parameter holding unit 102, on the basis of the process layer number included in the control command. The pooling processor 106 can then carry out the pooling process in accordance with the obtained information. The pooling processor 106 stores a result of the pooling process in the feature amount holding unit 108. Here, the pooling processor 106 can store a processing result for one tile (two lines) when the pooling process is not carried out, and a result obtained by pooling the results from one tile (one line) when the pooling process is carried out, in the feature amount holding unit 108.

Additionally, when the control command indicates that the block is the final tile in the final process layer, the pooling processor 106 can send a processing complete notification to a controller 101. Furthermore, the pooling processor 106 can send a notification indicating that processing is complete to the controller 101 when the processing for a single tile (or a single control command) is complete.

The processors 103 to 106 may have buffers that hold the received control commands. Such buffers can compensate for latency in the processing by the processors 103 to 106. The buffers may be configured to be capable of holding two or more control commands.

Additionally, a buffer may be provided between a first processor and a second processor among the plurality of processors, the buffer temporarily storing processing results transferred from the first processor to the second processor. For example, the calculation processor 104 may have a buffer that holds the output of the expansion processor 103, the activation processor 105 may have a buffer that holds the output of the calculation processor 104, and the pooling processor 106 may have a buffer that holds the output of the activation processor 105. Providing such buffers makes it possible for the processors 103 to 106 to start processing according to the next control command independently, without waiting for the processing by the previous and next processors to be completed.

The data processor 205 further includes the controller 101. The controller 101 determines a calculation order for the data of the blocks on the basis of structure information of the neural network, and sends a control command that controls the calculation order to the plurality of processors. As will be described later, the controller 101 can control the plurality of processors by issuing control commands on the basis of CNN network information. The controller 101 may control the data processor 205 as a whole.

In the example illustrated in FIG. 1, the controller 101 sends the same control command to the plurality of processors at once. In FIG. 1, the controller 101 is directly connected to the processors 103 to 106, and can send the control commands to the processors 103 to 106 without going through another controller. On the other hand, the processor 103 that has received a control command may transfer that control command to the processors 104 to 106. The controller 101 can send the control commands to the plurality of processors using such a configuration as well.

The data processor 205 may further include the parameter holding unit 102, the coefficient holding unit 107, and the feature amount holding unit 108. However, the functions of these processors may be implemented by memory such as the RAM 208.

The parameter holding unit 102 can hold parameters shared by the controller 101 and the processors 103 to 106, and may be RAM, for example. The parameter holding unit 102 can hold processing parameters indicating processing methods used by the plurality of processors for a block. The kernel size of a filtering process, a number of feature planes generated by the filtering process, the type of activation process, whether or not a pooling process is carried out and the type of the pooling process, and so on can be given as examples of the processing parameters. The parameter holding unit 102 can hold such processing parameters for each block on, for example, a process layer-by-process layer basis. As described above, the control command may include information specifying such processing parameters, e.g., the process layer number. The processors 103 to 106 can obtain the processing parameters from the parameter holding unit 102 in accordance with information indicating a storage location of the processing parameters in the parameter holding unit 102, such as the process layer number, and can then carry out processing according to the processing parameters.

Figures 8A, 8B:
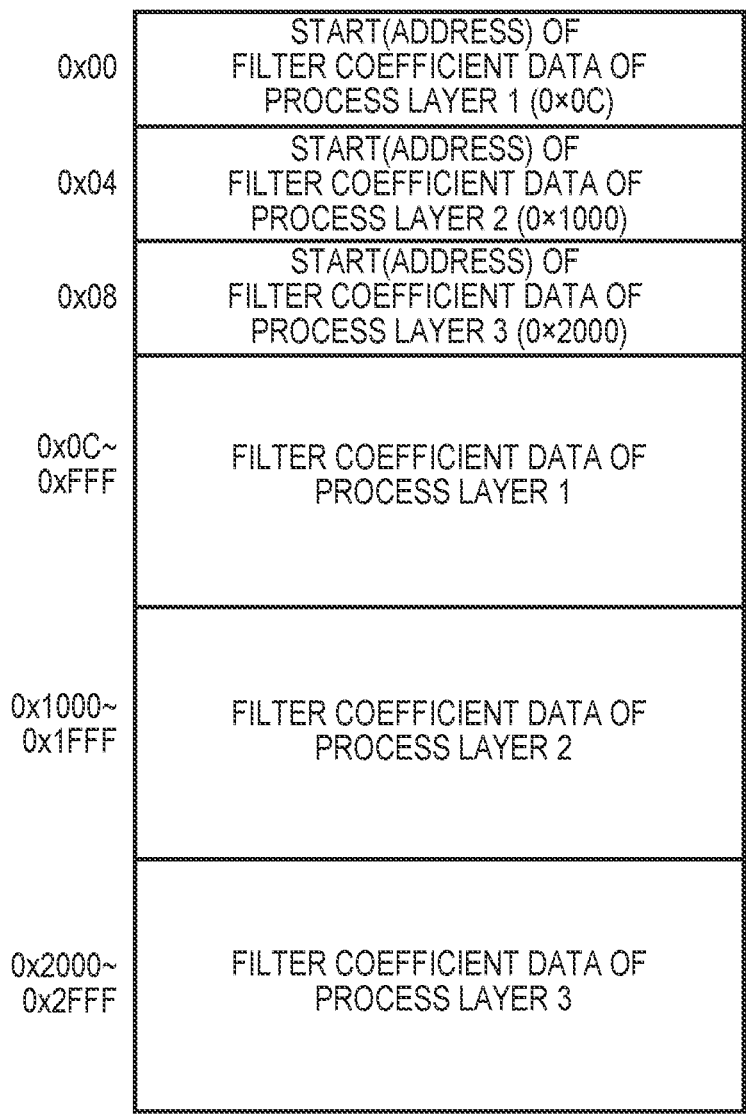
FIGS. 8A and 8B are diagrams illustrating the format of a control command and a data arrangement in a coefficient holding unit.

The coefficient holding unit 107 can hold the filter coefficients used in each process layer, and may be RAM, for example. To reduce the data amount, the filter coefficients may be run-length coded. As described above, the expansion processor 103 may obtain the filter coefficients held in the coefficient holding unit 107 in accordance with the process layer number. As such, the filter coefficients may be coded in units of process layers. For example, as illustrated in FIG. 8B, the coefficient holding unit 107 can hold the filter coefficients in correspondence with process layer numbers. In the present embodiment, the filter coefficients are written into the coefficient holding unit 107 by the CPU 206 in advance. In other words, the coefficient holding unit 107 may be a buffer that holds the filter coefficients used by the data processor 205, and the CPU 206 may read out the filter coefficients necessary for processing from memory such as the data storing unit 202 and write those filter coefficients into the coefficient holding unit 107.

The feature amount holding unit 108 can store some or all of the feature planes of each process layer, and may be RAM, for example. These feature planes are intermediate data of the computations corresponding to the CNN. Additionally, the feature amount holding unit 108 can also store the feature planes of process layer 3 (the feature planes of an output layer), which are the final output from the CNN. Note that the coefficient holding unit 107 and the feature amount holding unit 108 may be realized by the same memory (e.g., RAM).

Processing by Controller 101

An example of the processing carried out by the controller 101 will be described next with reference to the flowchart in FIG. 5. In step S501, the controller 101 reads out the network information stored in the RAM 208, and calculates the processing parameters for each process layer on the basis of the network information. The controller 101 stores the calculated processing parameters in the parameter holding unit 102.

FIG. 9A illustrates an example of the network information indicating the configuration of the CNN illustrated in FIG. 4. In FIG. 9A, the numerical values shown in the right column indicate parameter values for the CNN illustrated in FIG. 4. 1001 indicates the process layer number, which is 4 for the CNN illustrated in FIG. 4. 1002 indicates the width and height of the input image, which are 24 and 16, respectively, for the CNN illustrated in FIGS. 4. 1003 to 1006 indicate the number of feature planes, the kernel size, the type of the activation function, and the type of pooling for each of process layers 0 to 3. However, because process layer 0 is the input layer, the information aside from the number of feature planes is dummy information which is not referenced.

FIG. 9B illustrates an example of the processing parameters generated in step S501 on the basis of the network information illustrated in FIG. 9A. 1101 is the process layer number, and has the same value as 1001. 1102 to 1105 indicate a width and height of the feature planes, the number of feature planes, a tile number, the kernel size, the type of the activation function, and the type of pooling for each of process layers 0 to 3. The width and height of the feature planes for each process layer can be calculated by the controller 101 on the basis of the width and height of the input image (1002) and the type of pooling for each process layer. Additionally, the tile number for each process layer can be calculated by the controller 101 on the basis of the width and height of the feature planes and the type of pooling.

In step S502, the controller 101 issues control commands. The controller 101 can generate the control commands on the basis of the network information (FIG. 9A) and the processing parameters for each process layer (FIG. 9B). The controller 101 can then send the generated control commands to the expansion processor 103, the calculation processor 104, the activation processor 105, and the pooling processor 106.

In step S503, the controller 101 stands by until an end notification is received for the final control command sent in step S502. For example, the controller 101 stands by until an end notification is received for the final control command sent to the pooling processor 106. Receiving the end notification for the final control command means that the computations corresponding to the CNN have ended. In this case, the controller 101 can communicate an interrupt to the CPU 206.

Figure 6:
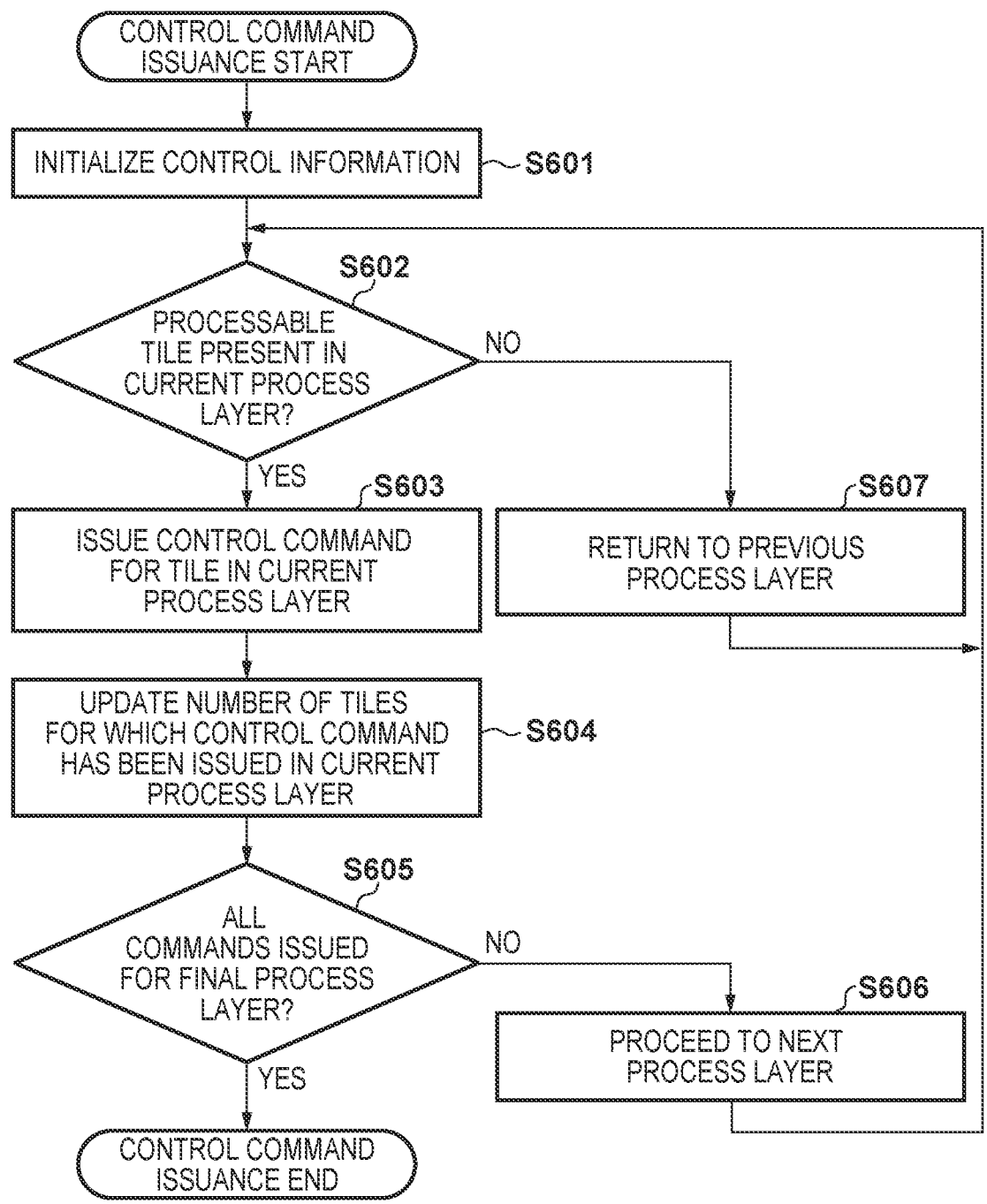
FIG. 6 is a flowchart illustrating processing carried out by the controller according to one embodiment.

A detailed example of the process for issuing the control commands, carried out in step S502, will be described next with reference to the flowchart in FIG. 6. The following describes a specific example of operations carried out in the processing corresponding to the CNN illustrated in FIG. 4. In the sequence illustrated in FIG. 6, process layers closer to the output layer (process layer 3) are processed preferentially to the greatest extent possible. In other words, if data of the tiles in a previous process layer, which is used to calculate the data of the tiles in a process layer closer to the output layer, has already been calculated, the data of the tiles in the process layer closer to the output layer is calculated preferentially. The controller 101 generates the control commands so that the data of the tiles is calculated according to such a calculation order.

As described in Japanese Patent Laid-Open No. 2018-147182, employing such a calculation order makes it possible to reduce the amount of intermediate data (the feature planes in process layers 1 and 2, aside from the output layer) held in the feature amount holding unit 108. For example, intermediate data which is held in the feature amount holding unit 108 but is not used in later processing can be overwritten with newly-generated intermediate data, which makes it possible to reduce the memory size of the feature amount holding unit 108.

In step S601, the controller 101 initializes control information. For example, the controller 101 can set the process layer number indicating the process layer currently being processed to the number (1) of process layer 1. Hereinafter, the process layer indicated by this process layer number will be called a "current process layer". Additionally, the controller 101 can set an already-generated tile number for each process layer to 0.

In step S602 to step S607, the controller 101 generates and sends the control commands for all of the tiles in all of the process layers (the process layers 1 to 3). First, in step S602, the controller 101 determines whether or not a processable tile is present in the current process layer. If a processable tile is present, the sequence moves to step S603, and if not, the sequence moves to step S607.

If the data of a tile (two lines) in the current process layer can be calculated by carrying out a filtering process at a kernel size K (K×K) on the feature planes in the process layer previous to the current process layer (called a "previous process layer" hereinafter), that tile is a processable tile. In other words, if the tiles in the previous process layer, which are used to calculate the data of the tile in the current process layer, have all been calculated, that tile is a processable tile. For example, if the feature amounts have already been calculated from an N−(K−1)/2th line to an N+1+(K−1)/2th line of the previous process layer, the tile including the Nth and N+1th line in the current process layer are processable tiles. In this example, the current process layer is process layer 1, and the feature planes (input image) of process layer 0 (the input layer), which is the previous process layer, can be referenced, and thus a determination of "yes" is made.

In step S603, the controller 101 issues, to the processors 103 to 106, control commands instructing the processable tile found in the current process layer in step S602 to be processed. The control commands can include information indicating the block subject to the data calculation. FIG. 8A illustrates an example of the format of the control command. As illustrated in FIG. 8A, the control command may include the number of the process layer to be processed and the number of the tile to be processed, and therefore can specify the tile subject to the feature plane data calculation.

Next, in step S604, the controller 101 adds 1 to the already-generated tile number of the current process layer.

Next, in step S605, the controller 101 determines whether or not control commands instructing all of the tiles in the final process layer to be processed have been sent. This determination can be made by referring to the already-generated tile number for the final process layer and the processing parameters for the final process layer (e.g., FIG. 9B). If the control commands have been sent, the sequence in FIG. 6 ends. If the control commands have not been sent, the sequence moves to step S606. In this example, only tile 0 of process layer 1 has been processed. A determination of "no" is therefore made, and the sequence moves to step S606.

In step S606, the controller 101 adds 1 to the process layer number. In this example, the process layer number becomes 2, and thus the current process layer becomes process layer 2. The sequence then returns to step S602. In this example, once the sequence returns to step S602, the controller 101 determines whether or not a processable tile is present in the current process layer (process layer 2). The data of line 0 to line 3 of the feature planes in process layer 1 is required to process tile 0 of process layer 2. However, at this point in time, only the data of line 0 and line 1 has been generated. A determination of "no" is therefore made, and the sequence moves to step S607.

In step S607, the controller 101 subtracts 1 from the process layer number. The sequence then returns to step S602, and the processing for the previous process layer is carried out.

When the above-described processing is repeated, the control commands instructing each tile to be processed are generated and sent in the order indicated in FIG. 7. Feature planes 701 to 704 of process layers 0 to 3, and the calculation order of the tiles, are indicated in FIG. 7. In FIG. 7, "tile t kth" indicates that a tth tile in the process layer is generated kth in the order. Note that location 705, denoted as "dummy", indicates a blank line added in order to carry out the filtering process. Once the control command for processing tile 3 of process layer 3 has been generated and sent, a determination of "yes" is made in step S605 immediately thereafter, and the process for generating and sending control commands ends.

FIG. 10 is a time chart of pipeline processing, illustrating the processing corresponding to the CNN illustrated in FIG. 4, carried out by the data processor 205 illustrated in FIG. 1. In FIG. 10, L[k]T[t] indicates that tile t in process layer k is being processed. The processing time for each process differs depending on the parameters, i.e., depending on the process layer.

In this example, each of the processors (103 to 106) has a buffer which stores four control commands. As such, rather than issuing a control command every time the processing of each of the processors (103 to 106) is completed, the controller 101 can issue four control commands in advance. In other words, the controller 101 sends a control command to at least one processor among the plurality of processors, asynchronously with respect to the operations of the at least one processor. According to this configuration, the configuration of the controller 101 can be simplified. For example, the controller 101 issues control commands for starting the processing of L[1]T[0], L[1]T[1], L[1]T[2], and L[1]T[3] to the processors (103 to 106) in sequence, independent of the operations of the expansion processor 103.

Note that after issuing the four control commands, in step S603, the controller 101 may issue new control commands after first standing by until the number of control commands not yet processed becomes three or fewer. In the example illustrated in FIG. 10, when the pooling processor 106 finishes processing L[1]T[0], the controller 101 issues a control command to the processors (103 to 106) to start the processing of L[2]T[0].

As illustrated in FIG. 10, the processors (103 to 106) can process different tiles in parallel through pipeline processing. Furthermore, each of the plurality of processors can start processing those tiles asynchronously with respect to each other. Note that in the example illustrated in FIG. 10, the calculation processor 104 starts processing the next process layer after the pooling process is complete for the previous process layer, as indicated by 1201 to 1203. However, even if the process layer changes in this manner, the expansion processor 103 can obtain the filter coefficients for the next process layer before the pooling processor 106 carries out the pooling process on the previous process layer. As such, the calculation processor 104 immediately starts processing the next process layer after the pooling process is complete for the previous process layer.

Another detailed example of the process carried out in step S502 will be described with reference to the flowchart in FIG. 11. In the sequence illustrated in FIG. 11, process layers closer to the input layer (process layer 0) are processed preferentially. As described in Japanese Patent Laid-Open No. 2018-147182, employing such a calculation order makes it possible to reduce the amount of filter coefficient data held in the coefficient holding unit 107. For example, filter coefficient data for a process layer which has already been processed, held in the coefficient holding unit 107, can be overwritten with filter coefficient data for a process layer to be processed later, and thus the memory size of the coefficient holding unit 107 can be reduced.

The process of step S1301 is the same as step S601. Likewise, the processes of steps S1302 and S1303 are the same as steps S603 and S604.

In step S1304, the controller 101 determines whether or not control commands instructing all of the tiles in the current process layer to be processed have been sent. If the control commands have been sent, the sequence moves to step S1305. If the control commands have not been sent, the sequence returns to step S1302, and the processes of steps S1302 to S1304 are repeated until control commands have been issued for all of the tiles in the current process layer.

In step S1305, the controller 101 determines whether or not the current process layer is the final process layer. If the current process layer is the final process layer, the sequence of FIG. 11 ends. However, if the current process layer is not the final process layer, the sequence moves to step S1306. The process of step S1306 is carried out in the same manner as step S606. The sequence then returns to step S1302, and the processes of steps S1302 to S1306 are repeated until control commands have been issued for all of the tiles in all of the process layers.

Figure 11:
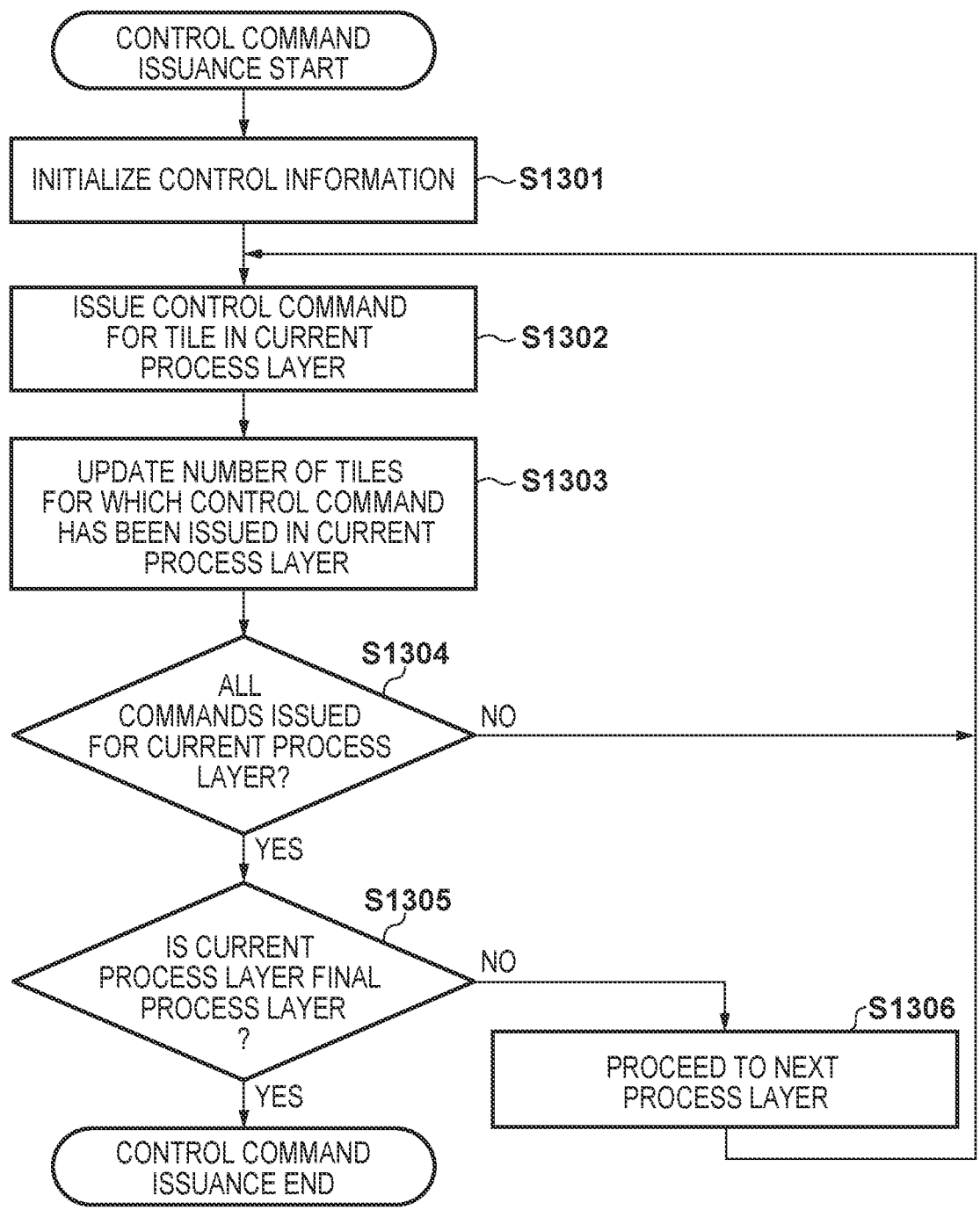
FIG. 11 is a flowchart illustrating processing carried out by the controller according to one embodiment.

Once the controller 101 has issued the control commands according to the sequence in FIG. 11, the data processor 205 processes, in order, tile 0 to tile 7 of process layer 1, tile 0 to tile 3 of process layer 2, and tile 0 to tile 3 of process layer 3.

The data processing apparatus according to the present embodiment as described thus far can, when carrying out computations corresponding to a neural network, carry out the computations efficiently regardless of the processing order of the layers or the tiles within the layers. For example, the data processing apparatus according to the present embodiment can flexibly process computations corresponding to neural networks having a variety of configurations. Additionally, the data processing apparatus according to one embodiment can carry out processing spanning a plurality of process layers on a region-by-region basis, and can carry out processing on a process layer-by-process layer basis.

As described with reference to FIGS. 6 and 11, the processing order of the layers or the tiles within the layers may be determined through a method selected from two or more determination methods. As described in Japanese Patent Laid-Open No. 2018-147182, the size of the filter coefficient data held in the coefficient holding unit 107 and the intermediate data held in the feature amount holding unit 108 can be controlled by switching the processing order in accordance with the neural network. Accordingly, the controller 101 can determine the processing order of the tiles in accordance with the capacity of the coefficient holding unit 107 or the capacity of the feature amount holding unit 108, so that the filter coefficient data or the intermediate data can be held. Additionally, the total size of the filter coefficient data and the intermediate data can be controlled by switching the processing order in accordance with the neural network. As such, the controller 101 can determine the processing order of the tiles so as to reduce the total size of the filter coefficient data and the intermediate data.

Second Embodiment

A data processing apparatus according to a second embodiment includes a first plurality of processors and a second plurality of processors. The first plurality of processors sequentially calculate the data of feature planes of a first partial structure of a neural network, and the second plurality of processors sequentially calculate the data of feature planes of a second partial structure of the neural network. Here, the second partial structure is different from the first partial structure. For example, side outputs from the first partial structure may be input to the second partial structure. With such a configuration, the second partial structure can carry out side output calculations.

A data processing apparatus that carries out computations corresponding to a side output-type neural network will be described as an example of the data processing apparatus according to the second embodiment. The configuration of and processing by the data processing apparatus are similar to the configuration of and processing by the data processing apparatus according to the first embodiment and illustrated in FIGS. 2 and 3, and thus only parts that are different from the first embodiment will be described hereinafter.

Figure 13:
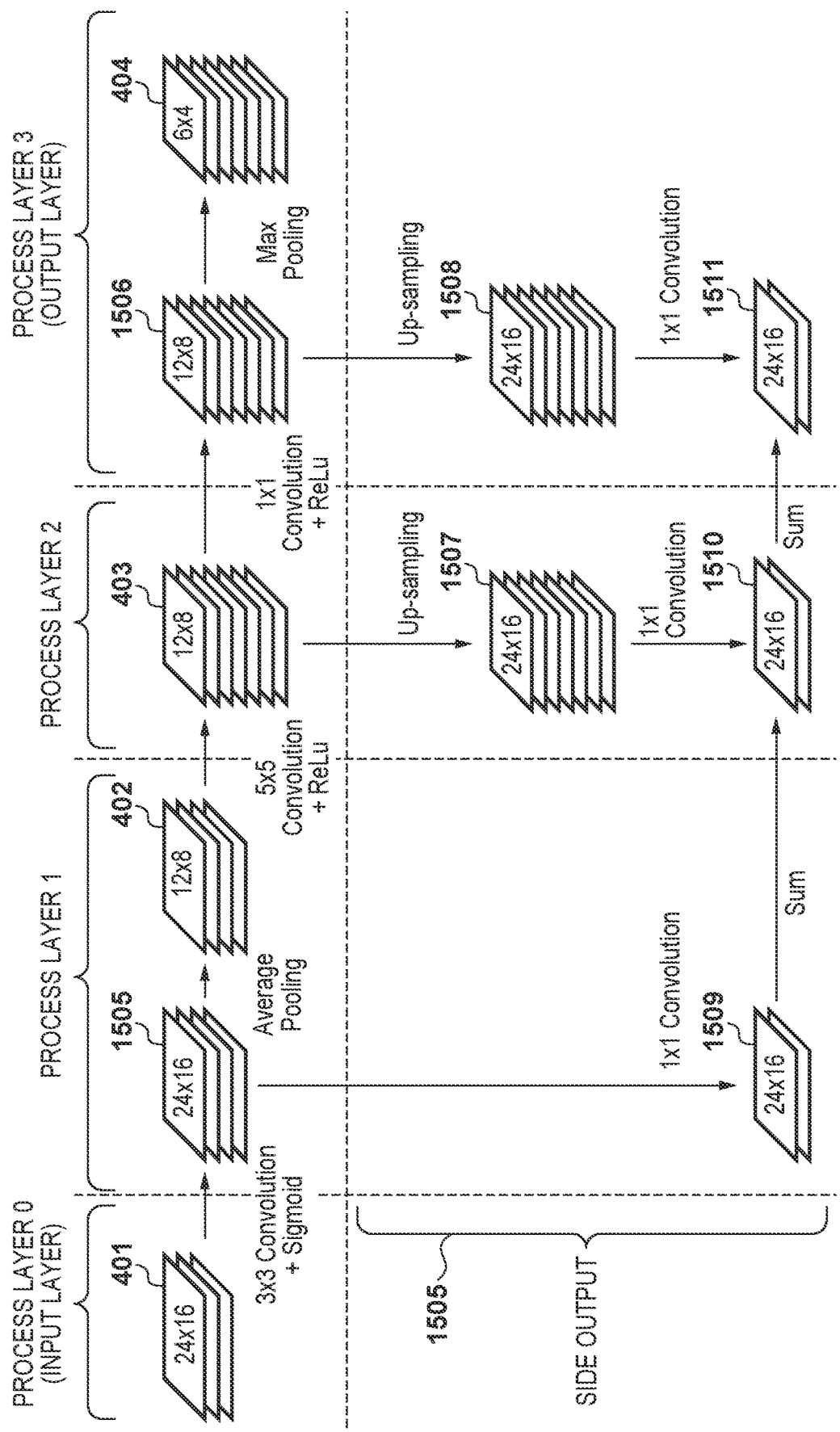
FIG. 13 is a diagram illustrating an example of the structure of a neural network.

FIG. 13 illustrates an example of a side output-type CNN used by the data processing apparatus. The feature planes 401 to 404 are the same as in FIG. 4. Feature planes 1505 and 1506 are feature planes obtained after the filtering process and activation process have been carried out on the feature planes 401 and 403, respectively, and are also generated through the processing illustrated in FIG. 4.

Feature planes 1507 to 1511 indicate side outputs. Feature planes 1505 are used as side outputs from process layer 1. Feature planes 1509 are two feature planes, having a size of 24×16, that are generated by carrying out a 1×1 kernel filtering process on the feature planes 1505. Feature planes 1507 are side outputs from process layer 2, and are feature planes, having a size of 24×16, obtained by enlarging the feature planes 403. Feature planes 1510 are obtained by carrying out a 1×1 kernel convolution operation on the feature planes 1507 and then superimposing the result of that operation on feature planes 1508. The feature planes 1508 are side outputs from process layer 3, and are feature planes, having a size of 24×16, obtained by enlarging the feature planes 1506. Feature planes 1511 are obtained by carrying out a 1×1 kernel convolution operation on the feature planes 1508 and then superimposing the result of that operation on feature planes 1510. The feature planes 1511 are the final output of the side output calculations.

In the present embodiment, network information indicating the configuration of the CNN illustrated in FIG. 13 can be used. This network information can include information of the side output network configuration, indicating whether or not there is side output, the size of the feature planes for the side output, and so on, in addition to the same information as that described in the first embodiment. This network information may be stored in the RAM 208, in the same manner as in the first embodiment.

Figure 12:
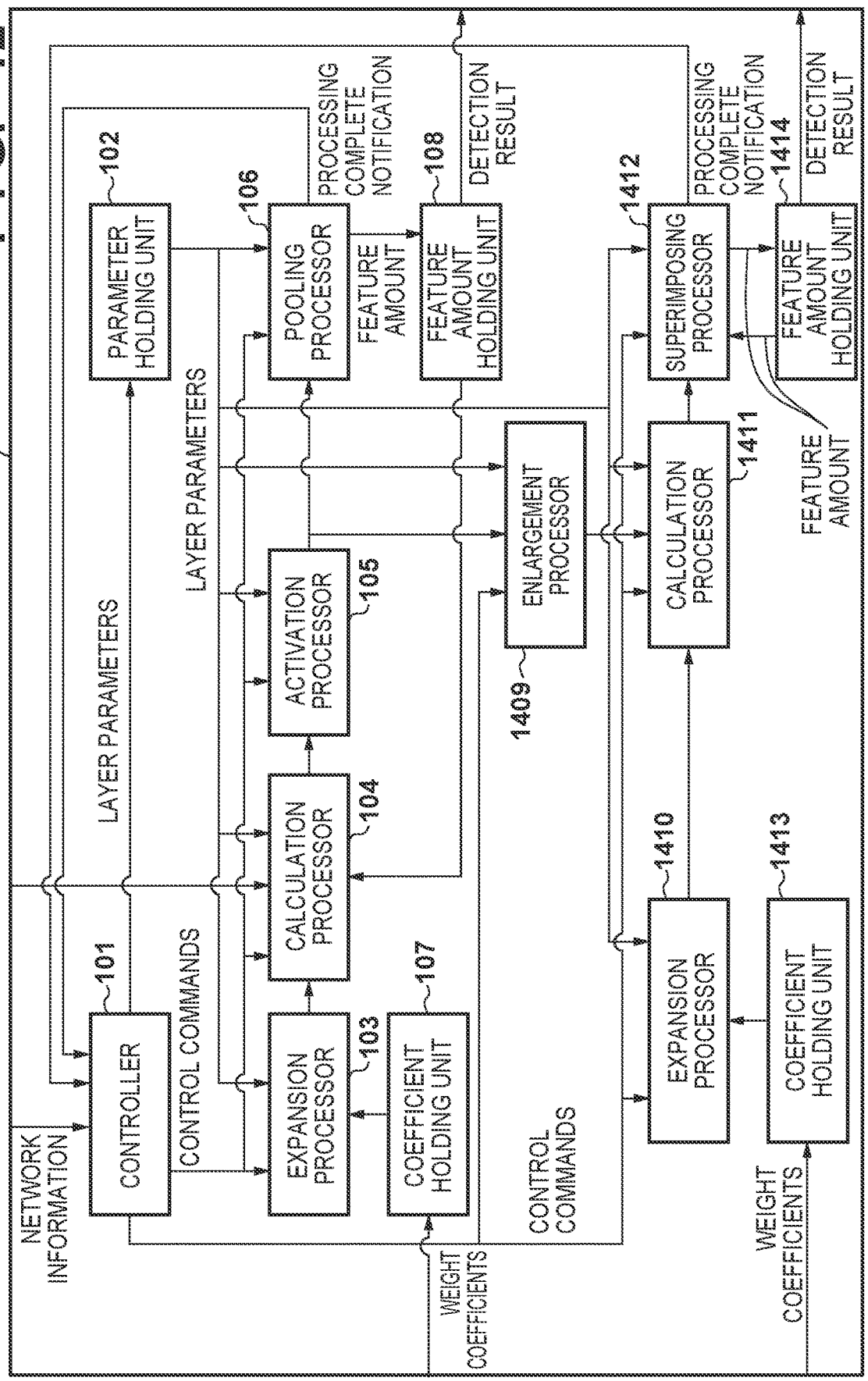
FIG. 12 is a block diagram illustrating an example of a data processor according to one embodiment.

FIG. 12 illustrates the configuration of the data processor 205 according to the present embodiment. The configurations of the expansion processor 103, the calculation processor 104, the activation processor 105, the pooling processor 106, the coefficient holding unit 107, and the feature amount holding unit 108 are the same as in the first embodiment. Aside from additionally issuing control commands to processors for the side output calculations (1409 to 1412), and receiving a processing complete notification from a superimposing processor 1412, the controller 101 is the same as in the first embodiment. Additionally, aside from holding processing parameters for the side output calculations, the parameter holding unit 102 is the same as in the first embodiment.

An enlargement processor 1409, an expansion processor 1410, a calculation processor 1411, and the superimposing processor 1412 are processors for the side output calculations. As in the first embodiment, the processors 1409 to 1412 may have buffers that hold the received control commands in order to compensate for latency in the processing. Additionally, as in the first embodiment, buffers for holding the outputs of the previous units may be provided between the processors 1409 to 1412. A coefficient holding unit 1413 is a memory that holds filter coefficients for the side output calculations, like the coefficient holding unit 107. Additionally, a feature amount holding unit 1414 is a memory that holds intermediate data and a final output obtained from the side output calculations, like the feature amount holding unit 108.

The enlargement processor 1409 enlarges the feature planes transferred from the activation processor 105, and outputs the enlarged feature planes to the calculation processor 1411. The enlargement processor 1409 can enlarge the transferred feature planes to the same size as the side output feature planes. On the other hand, when the post-activation process feature planes and the side output feature planes are the same size, as in process layer 1 illustrated in FIG. 13, the enlargement processor 1409 can output the transferred feature planes as-is. The enlargement processor 1409 may enlarge or reduce the feature planes at any desired magnification rate. The data processor 205 having this configuration can calculate side outputs having a variety of sizes.

The expansion processor 1410 and the calculation processor 1411 can carry out the same computations as the expansion processor 103 and the calculation processor 104. In other words, the calculation processor 1411 can carry out a filtering process on the feature planes transferred from the enlargement processor 1409, on a tile-by-tile basis, using the filter coefficients transferred from the expansion processor 1410. The calculation processor 1411 transfers the obtained computation result to the superimposing processor 1412. The superimposing processor 1412 superimposes the feature planes transferred from the calculation processor 1411 onto feature planes read out from the feature amount holding unit 1414 on a tile-by-tile basis, and stores the result in the feature amount holding unit 1414. Thus the superimposing processor 1412 can superimpose side outputs from the current process layer onto side outputs from the previous process layer. Additionally, when the control command indicates that the tile to be processed is the final tile in the final process layer, the superimposing processor 1412 can send a processing complete notification to the controller 101. Furthermore, the superimposing processor 1412 can send a notification indicating that processing is complete to the controller 101 when the processing for a single tile (or a single control command) is complete.

Processing carried out by the controller 101 according to the second embodiment will be described next. Aside from steps S503, S603, and S1302, the processing by the controller 101 is the same as in the first embodiment. In other words, in steps S603 and S1302, the controller 101 sends the control commands to the processors (1409 to 1412) in addition to the processors (103 to 106). Additionally, in step S503, the controller 101 can stand by until an end notification is received from both the pooling processor 106 and the superimposing processor 1412 for the final control commands.

The controller 101 can switch between whether or not to send control commands to the second plurality of processors (1409 to 1412) on the basis of structure information of the neural network. For example, the data processor 205 according to the second embodiment includes the functions of the data processor 205 according to the first embodiment. As such, the data processor 205 according to the second embodiment can flexibly process both a network that does not have side output (FIG. 4) and a network that does have side output (FIG. 13). For example, the control by the controller 101 can be switched on the basis of whether or not there is side output from the neural network. In other words, when there is no side output, the controller 101 can control the computations by sending control commands to the processors (103 to 106) in the same manner as in the first embodiment. On the other hand, when there is side output, the controller 101 can control the computations by sending control commands to the processors (103 to 106 and 1409 to 1412) as in the present embodiment.

Note that in the first and second embodiments, the controller 101 and the plurality of processors may be connected by a data bus in order to reduce the number of lines between the controller 101 and the processors. In this case, the controller 101 can send the control commands to the plurality of processors over the data bus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-110520, filed Jun. 13, 2019, which is hereby incorporated by reference herein in its entirety.

What is claimed is:

1. A data processing apparatus that carries out a computation corresponding to a neural network containing a plurality of layers, the apparatus comprising:
a plurality of processors configured to, through pipeline processing, calculate data of blocks, each of the blocks corresponding to a part of a feature plane in a layer of the plurality of layers; and
a control unit configured to determine a calculation order for the data of the blocks on the basis of structure information of the neural network, and to send a command that controls the calculation order to the plurality of processors.

2. The data processing apparatus according to claim 1, wherein the command includes information indicating the block for which the data is to be calculated.

3. The data processing apparatus according to claim 2, wherein the command further includes information specifying a processing parameter indicating a processing method used by the plurality of processors for the blocks.

4. The data processing apparatus according to claim 3, wherein the information specifying the processing parameter includes information specifying a layer to be processed in the neural network.

5. The data processing apparatus according to claim 1, wherein each of the plurality of processors has a buffer capable of holding two or more commands.

6. The data processing apparatus according to claim 1, wherein the control unit is further configured to send the command to each of the plurality of processors at once.

7. The data processing apparatus according to claim 1, wherein the control unit is further configured to send the command to at least one processor among the plurality of processors, asynchronously with respect to operations of the at least one processor.

8. The data processing apparatus according to claim 1, wherein the control unit is further configured to send the command to the plurality of processors over a bus.

9. The data processing apparatus according to claim 1, wherein each of the plurality of processors is configured to start processing of respective blocks asynchronously with respect to each other.

10. The data processing apparatus according to claim 1, further comprising:
a buffer provided between a first processor and a second processor among the plurality of processors, a processing result from the first processor being transferred to the second processor, the buffer temporarily storing the processing result.

11. The data processing apparatus according to claim 1, wherein the neural network contains a plurality of process layers, and at least one of the plurality of process layers includes a convolutional layer, an activation layer, and a pooling layer.

12. The data processing apparatus according to claim 11, wherein the one of the plurality of process layers has a plurality of intermediate layers including at least a convolution layer.

13. The data processing apparatus according to claim 11, wherein the control unit is further configured to determine the calculation order through prioritizing data of a process layer closest to an output layer among processable data of the plurality of process layers.

14. The data processing apparatus according to claim 1, wherein a first processing unit includes the plurality of processors, and
the apparatus further comprises:
a second processing unit including a plurality of processors that, through pipeline processing, calculate data of blocks, each of the blocks corresponding to a part of a feature plane in a layer of the plurality of blocks,
wherein the first processing unit is further configured to sequentially calculate data of a feature plane in a first partial structure of the neural network, and
the second processing unit is further configured to sequentially calculate data of a feature plane in a second partial structure of the neural network, the second partial structure being different from the first partial structure.

15. The data processing apparatus according to claim 14, wherein a side output from the first partial structure is input to the second partial structure.

16. The data processing apparatus according to claim 1, wherein first processing unit includes the plurality of processors, and
the apparatus further comprises:
a second processing unit including a plurality of processors that, through pipeline processing, calculate data of blocks, each of the blocks corresponding to a part of a feature plane in a layer of the plurality of layers,
wherein the control unit is further configured to switch whether or not to send the command to the second processing unit on the basis of structure information of the neural network.

17. A control method for carrying out a computation corresponding to a neural network containing a plurality of layers, the method comprising:
performing pipeline processing to calculate data of blocks with a plurality of processors, each of the blocks corresponding to a part of a feature plane in a layer of the plurality of layers;
determining a calculation order for the data of the blocks on the basis of structure information of the neural network; and
sending a command that controls the calculation order to the plurality of processors.

18. The data processing apparatus according to claim 1, wherein the structure information of the neural network indicates types of processes performed in respective layers.

19. The data processing apparatus according to claim 1, wherein the structure information of the neural network indicates at least one of sizes of feature planes, kernel sizes of filters, or a number of the feature planes in the plurality of layers.

20. The data processing apparatus according to claim 1, wherein each of the blocks corresponds to a tile of the feature plane.

* * * * *